United States Patent
Yang et al.

(10) Patent No.: US 10,282,326 B1
(45) Date of Patent: May 7, 2019

(54) ACTIVE INTERRUPT HANDLER PERFORMANCE MONITORING IN MICROPROCESSORS

(71) Applicant: Xilinx, Inc., San Jose, CA (US)

(72) Inventors: Yi-Hua E. Yang, San Jose, CA (US); Patrick Lysaght, Los Gatos, CA (US); Austin H. Lesea, Los Gatos, CA (US); Graham F. Schelle, Longmont, CO (US); Paul R. Schumacher, Berthoud, CO (US)

(73) Assignee: XILINX, INC., San Jose, CA (US)

( * ) Notice: Subject to any disclaimer, the term of this patent is extended or adjusted under 35 U.S.C. 154(b) by 202 days.

(21) Appl. No.: 14/527,659

(22) Filed: Oct. 29, 2014

(51) Int. Cl.
*G06F 13/24* (2006.01)
*G06F 13/26* (2006.01)

(52) U.S. Cl.
CPC ............. *G06F 13/24* (2013.01); *G06F 13/26* (2013.01)

(58) Field of Classification Search
CPC ................................. G06F 13/24; G06F 13/26
See application file for complete search history.

(56) References Cited

U.S. PATENT DOCUMENTS

| | | | | |
|---|---|---|---|---|
| 4,145,735 A * | 3/1979 | Soga | ...................... | G06F 9/4837 710/264 |
| 5,835,734 A * | 11/1998 | Alkalaj | ............... | G06F 15/7867 710/104 |
| 5,944,840 A * | 8/1999 | Lever | .................. | G06F 11/3419 714/20 |
| 7,197,586 B2 * | 3/2007 | DeWitt, Jr. | ............. | G06F 13/24 710/260 |
| 7,415,561 B2 * | 8/2008 | Jinzaki | .................... | G06F 13/24 710/263 |
| 7,830,172 B1 * | 11/2010 | Baxter | ................. | H03K 19/173 326/38 |
| 7,895,382 B2 * | 2/2011 | DeWitt, Jr. | ......... | G06F 11/3466 710/260 |
| 2003/0204792 A1 * | 10/2003 | Cahill | ................. | G06F 11/0757 714/55 |
| 2003/0204793 A1 * | 10/2003 | Mellitz | .................. | G01R 29/26 714/700 |
| 2008/0244746 A1 * | 10/2008 | Rozas | ..................... | G06F 21/57 726/25 |

(Continued)

OTHER PUBLICATIONS

Xilinx, Inc., Zynq-7000 AP SoC Technical Reference Manual, Chapter 7, Interrupts, User Guide, UG585 (v1.5), Mar. 7, 2013, pp. 184-192, San Jose, CA, USA.

*Primary Examiner* — Tim T Vo
*Assistant Examiner* — Herve Iradukunda
(74) *Attorney, Agent, or Firm* — Joshua Hamberger; Steven E. Roberts

(57) ABSTRACT

An integrated circuit is provided for obtaining interrupt performance metrics. The integrated circuit includes a microprocessor executing an interrupt service routing monitoring framework that includes an interrupt handler and an application programming interface. The interrupt handler executes in response to a trigger condition and obtains timing data that includes at least one sample of a value of a timing logic according to a sampling schedule. The API exposes interrupt configuration functionality for registering the interrupt handler with a supervisory program and for configuring the interrupt handler to obtain the timing data.

20 Claims, 5 Drawing Sheets

(56) References Cited

U.S. PATENT DOCUMENTS

| | | | |
|---|---|---|---|
| 2009/0083716 A1* | 3/2009 | Kimura | G06F 11/3612 717/129 |
| 2011/0145457 A1* | 6/2011 | Jung | G06F 13/24 710/260 |
| 2012/0089984 A1* | 4/2012 | Adar | G06F 9/4812 718/103 |
| 2012/0233367 A1* | 9/2012 | Koning | G06F 13/24 710/260 |
| 2014/0089546 A1* | 3/2014 | Machnicki | G06F 13/24 710/269 |
| 2014/0115198 A1* | 4/2014 | White | G06F 13/24 710/48 |
| 2014/0189185 A1* | 7/2014 | Yamashita | G06F 13/24 710/267 |

* cited by examiner

US 10,282,326 B1

ACTIVE INTERRUPT HANDLER PERFORMANCE MONITORING IN MICROPROCESSORS

TECHNICAL FIELD

Examples of the present disclosure generally relate to performance monitoring in integrated circuits and, in particular, to active interrupt handler performance monitoring in microprocessors.

BACKGROUND

Programmable integrated circuits (ICs) are often used to implement digital logic operations according to user configurable input. Example programmable ICs include complex programmable logic devices (CPLDs) and field programmable gate arrays (FPGAs). CPLDs often include several function blocks that are based on a programmable logic array (PLA) architecture with sum-of-products logic. A configurable interconnect matrix transmits signals between the function blocks. Many programmable ICs include hard-wired processors for performing certain functions. Alternatively, programmable ICs could also be programmed with soft processors in the programmable logic.

While the processors, either hard-wired or soft-programmed, are executing software, they may stop executing such software due to receiving an interrupt signal. When this occurs, the processor executes an interrupt handler in order to respond to the interrupt signal and to the event that generated the interrupt signal. Interrupts may be triggered to handle input/output information, processing events, and other events.

Performance metrics regarding interrupts are useful as an indicator of system health. For example, a metric that indicates how long an interrupt handler takes to begin executing may indicate whether the integrated circuit is "overloaded." However, often, obtaining performance metrics regarding interrupts may be difficult or impossible. For example, because interrupt signals may be generated by an input/output device at a time that may not be synchronized with the system clock of the hard-wired processor, an accurate measure of the time from issuing an interrupt signal to beginning to execute an interrupt handler may be difficult to obtain.

As has been shown, what are needed in the art are improved techniques for obtaining performance metrics for interrupts.

SUMMARY

An integrated circuit is provided. The integrated circuit includes a microprocessor that executes an interrupt-service-routine (ISR) monitoring framework. The ISR monitoring framework includes an interrupt handler that is executable in response to a trigger and condition and that obtains timing data that includes at least one sample of a value of a timing logic according to a sampling schedule. The ISR monitoring framework also includes an application programming interface that exposes interrupt-configuration functionality for registering the interrupt handler with a supervisory program and for configuring the interrupt handler to obtain the timing data.

A method is provided. The method includes executing an interrupt handler in response to a trigger condition, the interrupt handler obtaining timing data that includes at least one sample of a value of a timing logic according to a sampling schedule. The method also includes exposing interrupt-configuration functionality for registering the interrupt handler with a supervisory program and for configuring the interrupt handler to obtain the timing data.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting in scope.

To facilitate understanding, identical reference numerals have been used, where possible, to designate identical elements that are common to the figures. It is contemplated that elements of one example may be beneficially incorporated in other examples.

DETAILED DESCRIPTION

Several techniques for monitoring interrupt performance are provided. In one example technique, interrupt performance of "synthetic interrupts" is monitored. In another example technique, interrupt performance of actual interrupts is monitored.

The technique for monitoring synthetic interrupts includes executing monitoring software that configures a cycle counter to generate synthetic interrupts periodically. These interrupts are "synthetic" in that the interrupts are generated to simulate other interrupts. Thus, the synthetic interrupts are configured to be similar to a particular "subject" interrupt in various aspects, where a "subject interrupt" is an interrupt whose performance is to be measured. For example, the synthetic interrupts may be of the same type as the subject interrupts and may be configured such that the triggering interrupt signal flows through the same path as an associated interrupt signal for the subject interrupt. In general, the synthetic interrupts mimic the behavior of the subject interrupts in as many ways as possible.

The monitoring software registers a customized interrupt handler that is executed when the cycle counter generates a synthetic interrupt signal. The customized interrupt handler includes a first level (or "hard") interrupt handler and a second level (or "soft") interrupt handler. The hard interrupt handler is executed with higher priority and includes basic operations. The soft interrupt handler is executed with lower priority but includes other operations associated with the interrupt handler. The hard and soft interrupt handlers include instructions to record the value stored in the cycle counter (i.e., a cycle count) at various points, in order to obtain performance metrics. The performance metrics indicate how fast the interrupt handlers are scheduled and execute and may be used to indicate how efficiently an integrated circuit is running and/or be used to perform security-related monitoring.

For the techniques for monitoring non-synthetic, "actual" interrupts (as opposed to synthetic interrupts), instead of configuring a cycle counter to generate synthetic interrupts periodically, the monitoring software simply modifies an interrupt handler for a particular interrupt that is to be monitored. The monitoring software modifies this interrupt handler to monitor performance metrics of the particular interrupt of interest. The particular interrupt of interest may be any interrupt that is generated by, for example, a microcontroller or other device.

Figure 1:
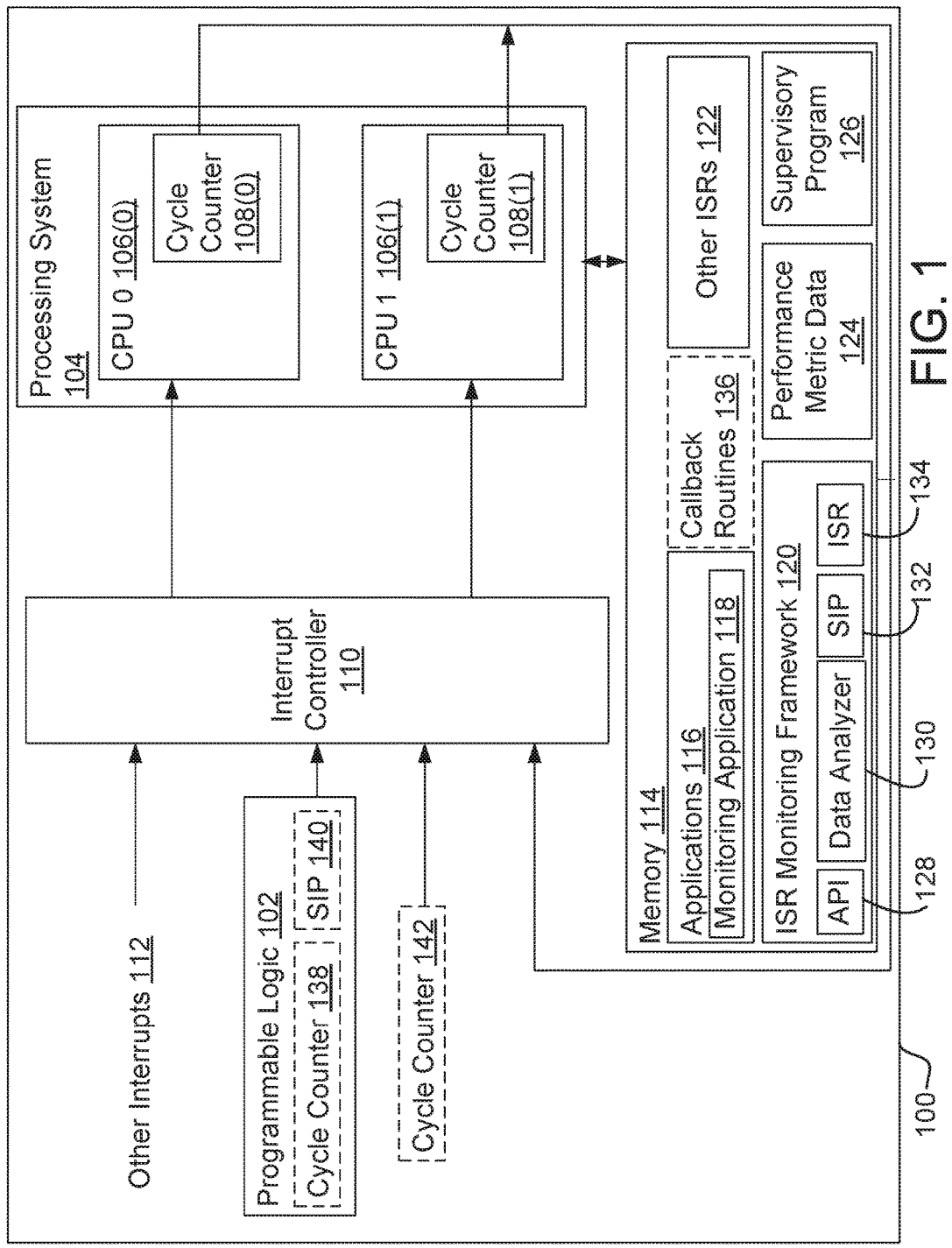
FIG. 1 illustrates an integrated circuit architecture according to an example implementation.

FIG. 1 illustrates an integrated circuit ("IC") 100 that includes programmable logic 102 and a processing system 104. The programmable logic 102 is generally a programmable logic device ("PLD") that includes reconfigurable circuit elements that can be reconfigured to generate different circuit configurations to construct one or more "soft" devices such as processors or other circuits. In one example, the programmable logic 102 includes a large number of different programmable tiles including multi-gigabit transceivers ("MGTs"), configurable logic blocks ("CLBs"), random access memory blocks ("BRAMs"), input/output blocks ("IOBs"), configuration and clocking logic ("CONFIG/CLOCKS"), digital signal processing blocks ("DSPs"), specialized input/output blocks ("I/O") (e.g., configuration ports and clock ports), and other programmable logic such as digital clock managers, analog-to-digital converters, system monitoring logic, and so forth. Optionally, each programmable tile includes a programmable interconnect element ("INT") having standardized connections to and from a corresponding interconnect element in each adjacent tile. The programmable interconnect elements include the connections to and from the programmable logic element within the same tile. The programmable logic 102 may be a field programmable gate array ("FPGA") architecture.

IC 100 also includes a processing system 104. The processing system 104 includes two hard-wired (as opposed to configurable) processors—central processing unit ("CPU") 0 106(0) and CPU 1 106(1) (collectively referred to as "CPUs 106" or generally referred to as a "CPU 106"). Any part or all of the processing system 104 may be fabricated as part of the die that implements the programmable logic 102 of the IC 100. The CPUs 106 can be any of a variety of different hard-wired processor types and/or systems. While two CPUs are shown by way of example, the processing system 104 can generally include at least one CPU.

IC 100 also includes memory 114 that stores various instructions for execution as well as data. The memory 114 stores applications 116, interrupt service routine (ISR) monitoring framework 120, other ISRs 122, performance metric data 124, a supervisory program 126, and optional callback routines 136. The supervisory program 126 may be a traditional operating system or may be a hypervisor or a control program executing on a bare metal system (i.e., without an operating system executing). The term "supervisory program" as used herein includes each of the aforementioned terms, including a traditional operating system, a hypervisor, and a control program executing on a bare metal system. The ISR monitoring framework 120 includes an application programming interface (API) 128, a data analyzer 130, a synthetic interrupt programmer (SIP) 132, and an interrupt service routine 134. These elements are discussed in more detail below.

The term "timing logic" may refer to cycle counter 108 included in CPU 106, cycle counter 138 included in the programmable logic 102, or standalone cycle counter 142. SIP may be either SIP 140 included in programmable logic 102 or SIP 132 located in memory 114 and executed by CPU 106.

The programmable logic 102 and processing system 104, as well as other components such as input/output devices, may trigger interrupts, for a variety of reasons, as is generally known. IC 100 includes an interrupt controller 110 for handling these interrupts. The interrupt controller 110 receives interrupt signals generated by the programmable logic 102, the processing system 104, or other components (represented as "other interrupts 112") such as input/output devices, sorts and prioritizes the interrupts, and transmits the interrupts to a CPU 106 for handling. Generally, when a CPU 106 receives an interrupt signal, the CPU "interrupts" currently executing software (i.e., causes the currently executing software to suspend execution), executes an interrupt handler (also referred to herein as an "interrupt service routine" or "ISR"), and then returns to executing the interrupted software. Interrupt signals include and are identified by an interrupt identifier ("interrupt ID"). The interrupt ID generally indicates what "type" the interrupt is. For example, one interrupt may be an interrupt to provide keyboard input, another interrupt may be an interrupt related to display information, and so on. A CPU 106 that receives an interrupt signal executes a particular interrupt handler for that interrupt based on the interrupt ID and as specified by the supervisory program. The supervisory program specifies the interrupt handler that handles a particular interrupt. A software program may make a system call to the supervisory program in order to modify which interrupt handler executes in response to a interrupt signal having a particular interrupt ID.

The synthetic interrupt programmer (SIP) 132 is software or hardware that performs functionality for configuring interrupt generation to the CPUs 106. More specifically, for the technique that utilizes synthetic interrupts, the SIP 132 sets timing logic (i.e., cycle counter 108 or optional cycle counter 138 or cycle counter 142) to cause synthetic interrupt signals to issue. The SIP 132 may also provide information to data analyzer 130, which calculates various performance metrics and stores the calculated results in performance metric data 124. Data analyzer 130 may include hardware or software that calculates one or more performance metrics and/or generates statistical data and stores that statistical data in the performance metric data 124.

The interrupt service routine (ISR) 134 is a "synthetic" interrupt service routine that executes when timing logic issues an synthetic interrupt signal to issue. ISR 134 is a custom interrupt service routine that measures various performance metrics upon execution. During execution, ISR 134 may execute various callback routines 136 provided by monitoring application 118. The callback routines 136 allow emulation of various aspects of interrupt performance. ISR 134 is discussed in greater detail below with respect to FIG. 3. For the technique that utilizes synthetic interrupts, the ISR 134 is a lightweight interrupt handler that includes some performance monitoring instructions and may include other instructions configured to emulate interrupt behavior. For the technique that utilizes non-synthetic interrupts, the ISR 134 is a modified version of an ISR that is already associated with a particular interrupt functionality.

The API 128 within the ISR monitoring framework 120 provides functionality for instructing the SIP 132 to monitor interrupt performance by exposing certain functions to user-space software. For the technique that utilizes synthetic interrupts, these functions allow user-space software to begin triggering synthetic interrupts for monitoring interrupt performance and to adjust timing logic for triggering synthetic interrupts. For the technique that does not utilizes synthetic interrupts, the API 128 provides functionality for instructing the SIP 132 to register, as interrupt handler 134, an interrupt handler that is a modified version of an already-existent interrupt handler. For either the synthetic or non-synthetic interrupt technique, the API 128 provides functionality to obtain interrupt performance data recorded by the ISR monitoring framework 120, and to end interrupt performance monitoring. The API 128 is discussed in greater detail below.

The monitoring application 118 within memory executes in user-space and requests specific functionality to be performed by the ISR monitoring framework 120. This functionality is exposed via the API 128 so that a programmer may configure monitoring application 118 to obtain interrupt performance metrics in a flexible manner.

Also included in memory 114 are other ISRs 122, which are generally unrelated to the ISR monitoring framework 120, but execute when various interrupt signals are generated, as is generally known. Although not specifically related to ISR 134, these other ISRs 122 may affect the interrupt performance by varying processing load experienced by CPUs 106.

In an example implementation of a technique that uses synthetic interrupts, the CPUs 106 include cycle counters 108(0) and 108(1) (collectively referred to as "cycle counters 108" or generally referred to as a "cycle counter 108"). The cycle counters 108 can be monotonically increasing or decreasing counters and can include a memory that stores a count. A cycle counter 108 is incremented (or decremented) at some predefined number of clock cycles for which the corresponding CPU 106 is not clock-gated. The cycle counters 108 can be configured such that upon meeting a trigger condition, a synthetic interrupt is generated. The trigger condition may include a counter overflow (i.e., a counter reaching a maximum value), a counter-zero condition (i.e., a counter reaching a zero value), or a compare-value condition (i.e., the counter being equal to a particular preset value). More specifically, when a count stored in a cycle counter 108 reaches a minimum value, a maximum value, or some predefined value, a synthetic interrupt will be triggered. The cycle counter 108 generates a synthetic interrupt signal when the counter meets the trigger condition (e.g., increments beyond the maximum value, decrements beyond the minimum value, increments/decrements beyond the predefined value). The cycle counter 108 transmits that synthetic interrupt signal to the interrupt controller 110 for handling. The interrupt controller 110 transmits the synthetic interrupt signal to a CPU 106 for handling.

As described above, the specific interrupt handler that executes in response to the synthetic interrupt signal is configurable. In other words, software may modify which interrupt handler executes in response to a CPU 106 receiving a synthetic interrupt signal. This modification may be done by sending a request to an operation system or through other techniques. Further details regarding interrupts are described below with respect to FIG. 2.

The cycle counter 108 may be included in a performance monitoring unit (PMU) included in each CPU 106. The PMU is a unit that includes several registers that store values related to various performance metrics of the CPU 106 and can also generate interrupts based on these stored values.

As described above, the SIP configures timing logic for generating synthetic interrupt signals. In one example, the timing logic configurable by the SIP 132 in order to generate the synthetic interrupt signal described above is the cycle counter 108 included in a CPU 106. In this example, the SIP 132 adjusts the cycle counter 108 included in CPU 106 so that the cycle counter 108 generates the synthetic interrupt signal after a certain number of cycles have elapsed. In other examples, the timing logic for generating the synthetic interrupt signal may be included in the programmable logic 102 (as cycle counter 138) or may be a standalone cycle counter 142 not included in either a CPU 106 or the programmable logic 102. In either example, SIP 132 is able to configure the timing logic to be set to a specific value in order to control the timing with which synthetic interrupt signals are issued.

In an example implementation of a technique that uses non-synthetic interrupts, the cycle counter 108 is not configured to generate synthetic interrupts. Instead, an interrupt handler for a particular interrupt for which performance is to be monitored is modified to include performance monitoring instructions, as described in more detail below.

Figure 2:
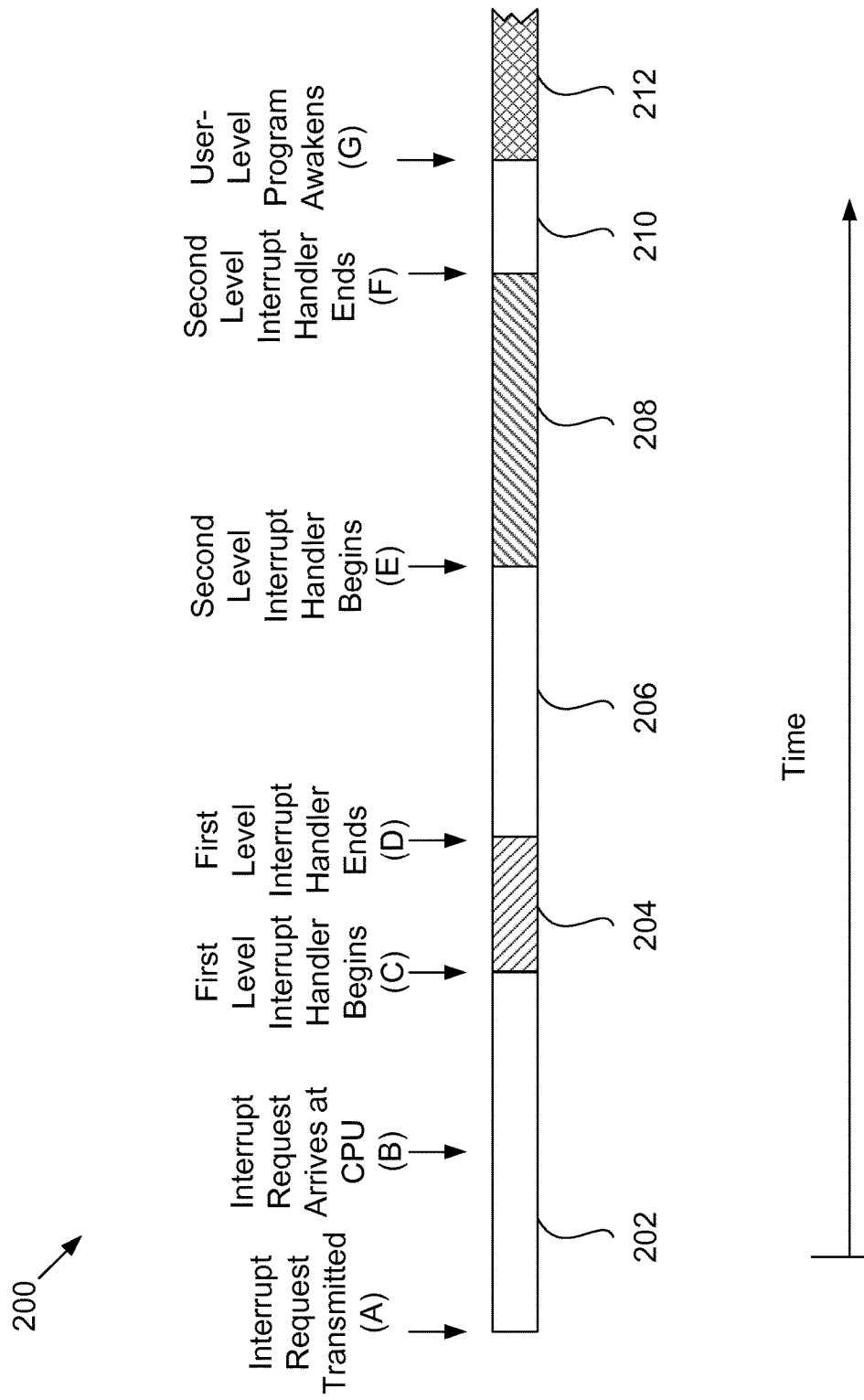
FIG. 2 illustrates a timeline for execution of an interrupt handler, according to an example.

FIG. 2 illustrates a timeline 200 for execution of an interrupt handler, in which time proceeds from left to right. At the earliest time (A), an interrupt signal (e.g., the synthetic interrupt signal) is generated and transmitted by a unit (such as a CPU 106, programmable logic 102, or input/output device) to the interrupt controller 110. After this interrupt signal is transmitted, the interrupt controller 110 processes the interrupt signal and transmits that interrupt signal to the CPU 106 for handling. The point in time at which a CPU 106 receives the interrupt signal is indicated in FIG. 2 as time (B).

When a CPU 106 receives an interrupt signal, the CPU 106 stops execution of current software, saving state for a current context (where state can be, for example, register values, and where the context can be a currently executing process), and begins execution of a first-level interrupt handler (also referred to herein as a "hard ISR") in order to respond to the received interrupt signal. There is some delay between the time that the CPU 106 actually receives the interrupt signal and when the CPU 106 begins executing the first level interrupt handler. Thus, the point in time at which the first-level interrupt handler initiates execution is indicated in FIG. 2 as time (C). During execution of the first-level interrupt handler, high-priority operations, such as recording information available at the time of the interrupt, are performed. Further, some other interrupts are generally "masked" or disallowed during execution of the first-level interrupt handler. Generally, the first-level interrupt handler includes few instructions and performs only basic functions. Functions that do not have high priority can be performed optionally in a second-level interrupt handler, described below. The point in time at which the first-level interrupt handler ends is indicated in FIG. 2 as time (D).

The first-level interrupt handler can include a call to an optional second-level interrupt handler (also referred to herein as a "soft ISR" or "threaded ISR"). This second-level interrupt handler is executed at a lower priority than the first-level interrupt handler and may be scheduled by the supervisory program for execution with other processes executing on CPU 106. The second-level interrupt handler is generally more flexible than the first-level interrupt handler in that more instructions can be executed by the threaded, second-level interrupt handler than by the first-level interrupt handler, which blocks the CPU. After the first-level interrupt handler ends, some time passes, after which the second-level interrupt handler begins. The point in time at which the second-level interrupt handler begins is indicated in FIG. 2 as time (E).

The second-level interrupt handler executes additional operations associated with handling the interrupt that have a lower priority than the first-level interrupt handler. Because of this lower priority, the supervisory program can switch contexts out of the second-level interrupt handler in order to execute other software while the second-level interrupt handler is executing (thus, the second-level interrupt handler is also referred to as a "threaded" interrupt handler"). The point in time at which the second-level interrupt handler ends is indicated in FIG. 2 as time (F). At some point in time, a user-level program that was running prior to execution of the first-level interrupt handler will resume execution. This point in time is indicated in FIG. 2 as time (G).

The length of various time periods associated with the timeline 200 depicted in FIG. 2 are useful for the purposes of obtaining performance metrics. For example, time period 202 (also referred to as "hard ISR startup latency"), between point (A) and point (C), indicates how much time elapses from when the interrupt signal is generated and when the interrupt handler (or, more specifically, the first-level interrupt handler) begins executing. Time period 204 (also referred to herein as the "hard ISR execution time") indicates the amount of time that the hard ISR takes to execute. Time period 206 (also referred to as the "threaded ISR scheduling latency") refers to the amount of time between when the hard ISR ends and the soft ISR begins. Time period 208 (also referred to as the "threaded ISR execution time") refers to the amount of time that the threaded ISR takes to execute. Time period 210 (also referred to as the "user program response latency") refers to the amount of time from when the threaded ISR finishes executing and when the user-level program begins executing. Finally, time period 212 simply indicates an amount of time during which the user-level program is executing. FIG. 2 does not show the end of time period 212.

These various time periods shown in FIG. 2 can be used as performance metrics. For example, one or more of these time periods may indicate an overall processing load of the CPUs 106 or an overall interrupt load (number of interrupts generated per unit of time), as well as other performance-related metrics. However, in typical systems, measuring some or all of these time periods may be difficult. For example, in many situations, the time at which an interrupt signal is generated and transmitted to the interrupt controller 110 (FIG. 1) may not be determinable, because that interrupt signal may be generated in an asynchronous manner (e.g., in the middle of a CPU 106 clock cycle). Thus, determining the hard ISR startup latency may be difficult in such systems. Additionally, because during normal program execution, the incidence of interrupt issuance may not be uniform, reliable performance metrics for those interrupts are not necessarily easily obtainable.

For these reasons, techniques are provided herein to reliably measure performance metrics for interrupts. The ISR monitoring framework 120 described above is used to measure performance metrics by programmatically triggering synthetic interrupts or by programmatically altering an ISR for a non-synthetic interrupt. The synthetic interrupts emulate actual interrupts and can be generated by timing logic according to various timing mechanisms as described above. The synthetic interrupts invoke interrupt handler 134, which can be configured as lightweight ISRs with minimal impact to system performance. As described above, in an example, the timing logic includes the cycle counters 108 which are configured to periodically trigger the synthetic interrupts. In another example, other timing logic can be used (e.g., cycle counter 138 in the programmable logic 102 or standalone cycle counter 142) to trigger the synthetic interrupts. Upon receiving synthetic interrupt signals, the CPU 106 executes synthetic interrupts according to the sequence as described with respect to FIG. 2 (i.e., executes a first-level interrupt handler and optionally a second-level interrupt handler, and returns to executing user-level software). Custom interrupt handlers (i.e., interrupt handler 134) are registered with the supervisory program in order to record performance metrics related to the synthetic interrupts. For the technique that involves non-synthetic interrupts, the non-synthetic interrupts invoke interrupt handler 134 that has been modified by ISR monitoring framework 120 to perform performance monitoring operations.

Figure 3:
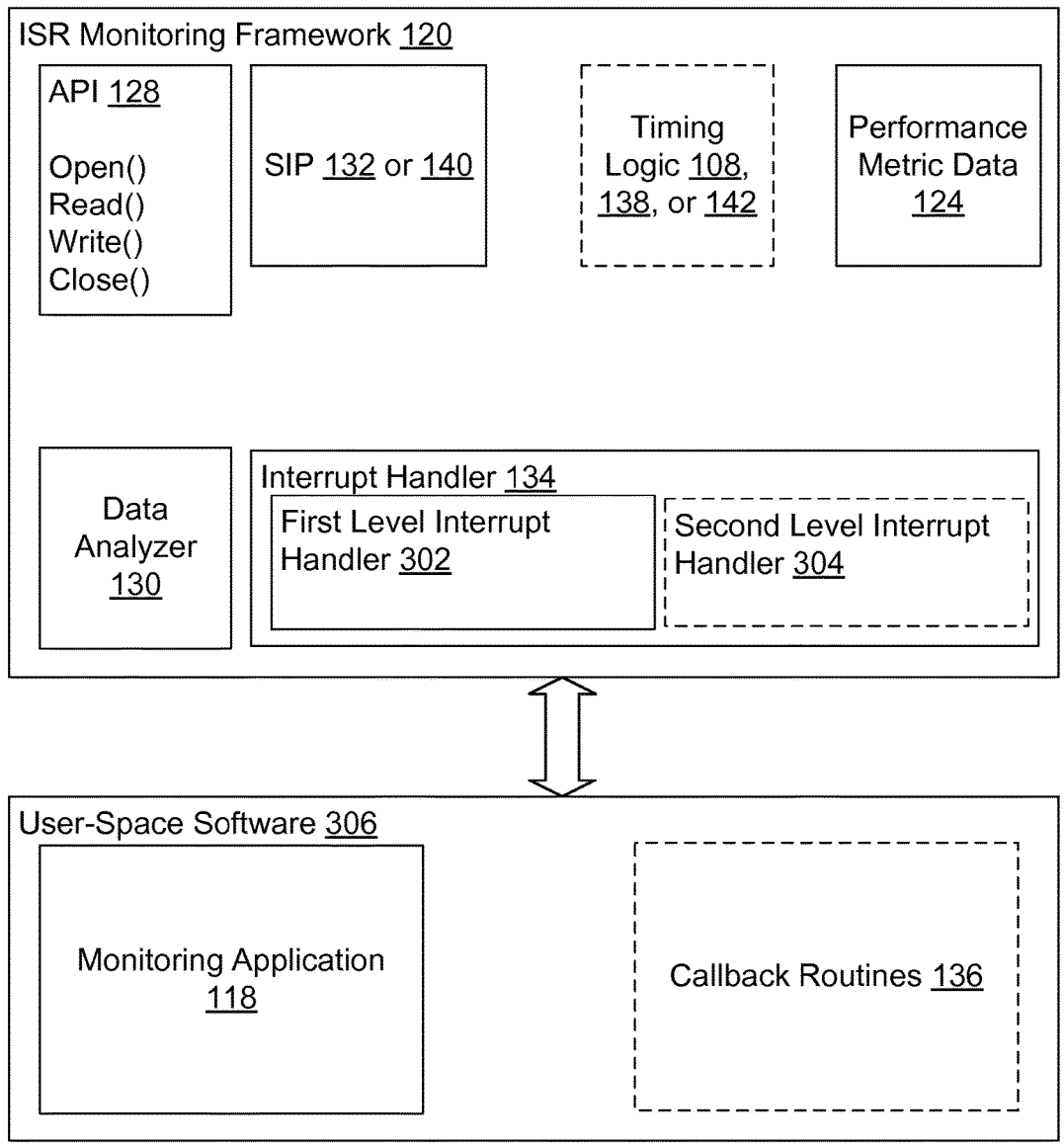
FIG. 3 illustrates a framework for performing monitoring operations for taking interrupt performance metrics in the integrated circuit of FIG. 1.

FIG. 3 illustrates the ISR monitoring framework 120 of FIG. 1. The framework 120 includes components for providing the monitoring functionality described above with respect to FIG. 1. The framework 120 is in communication with user-space software 306, which functions to request monitoring functionality from the ISR monitoring framework 120.

The ISR monitoring framework 120 includes an API 128, SIP 132, optional timing logic 138 or 140, performance metric data 124, data analyzer 130, and interrupt handler 134. The interrupt handler 134 includes a first level interrupt handler 302 and an optional second level interrupt handler 304.

The user-space software 306 includes a monitoring application 118 and, optionally, at least one call-back routine 136. The monitoring application 118 interfaces with the SIP 132 via the API 128. The API 128 includes several functions, such as: Open( ), Write( ), Read( ), and Close( ). Open( ) instructs the SIP 132 to register an interrupt service routine with OS 126 (FIG. 1) and to begin monitoring interrupts. Write( ) instructs the SIP 132 to adjust the timing with which interrupts are triggered, in techniques that use a synthetic interrupt. Read( ) reads data stored in performance metric data 124 and optionally resets that data. Close( ) terminates SIP 132 operation and removes the synthetic ISR from memory such that the synthetic ISR is no longer executed when the synthetic interrupt signal is generated, in techniques that use a synthetic interrupt, or restores an unmodified version of an ISR that was replaced in techniques that use a non-synthetic interrupt.

As described above, in a technique that uses synthetic interrupts, when monitoring application 118 calls the Open ( ) function, the SIP 132 begins operations for synthetic interrupt generation. More specifically, SIP 132 configures timing logic (such as the cycle counter 108 or cycle counter 138 or 142) to store a particular internal value. In one example, the SIP 132 may set the value stored in the timing logic to 100,000 less than a maximum value that may be stored by the timing logic. After 100,000 cycles, timing logic overflows and generates a synthetic interrupt signal, which causes the interrupt handler 134 to execute. After each synthetic interrupt signal is generated, SIP 132 resets the value stored in the timing logic such that a new synthetic interrupt signal is generated after some desired number of clock cycles have elapsed. SIP 132 also registers the interrupt handler 134 so that the interrupt handler 134 is executed when the timing logic generates a synthetic interrupt signal. SIP 132 registers the interrupt handler 134 with the synthetic interrupt signal generated by timing logic by making the appropriate supervisory program call or performing another appropriate operation. In the technique that uses non-synthetic interrupts, when monitoring application 118 calls the Open( ) function, the SIP 132 registers ISR 134 with a particular interrupt functionality so that when the interrupt functionality generates an interrupt signal, the ISR 134 is called.

For the technique that uses synthetic interrupts, the Write ( ) function allows the monitoring application 118 to instruct the SIP 132 to adjust the timing with which synthetic interrupt signals are generated. More specifically, via the Write( ) function, the monitoring application 118 may cause the SIP 132 to change the value (either up or down) that the SIP 132 sets the timing logic to after interrupt handler 134 has executed. For example, instead of setting the value to 100,000 less than a maximum, monitoring application 118 may instruct SIP 132, via the Write( ) function, to set the value to 200,000 less than the maximum value. The monitoring application 118 may also instruct the SIP 132, via the Write( ) function, to change other timing parameters. For example, monitoring application 118 may instruct SIP 132 to reset the value stored in the timing logic such that interrupts are not generated with a constant period, but instead with a varying period (e.g., first after 100,000 cycles, and then after 200,000 cycles). The schedule at which synthetic interrupt signals are generated is referred to herein as an interrupt schedule.

The monitoring application 118 may also request from SIP 132, via the Read( ) function, recorded measurements. The measurements may be the raw measurements taken by the interrupt handler 134, performance metric data 124 as calculated by data analyzer 130, or both.

The monitoring application 118 may, via the Close( ) function, terminate operations of the ISR monitoring framework 120. More specifically, the Close( ) function causes the SIP 132 to terminate operations and to un-register the interrupt handler 134 with the synthetic interrupt so that the interrupt handler 134 is not executed when synthetic interrupt signals are generated. In techniques that use a non-synthetic interrupt, the Close( ) function restores an unmodified version of an ISR that was replaced.

In an example, call-back routine(s) 136 is/are executed after or while the interrupt handler 134 executes. The monitoring application 118 can register call-back routine(s) 136 with the framework 120 (via, e.g., a Register( ) function in API 128) so that the interrupt handler 134 will invoke the call-back routine(s) 136. The call-back routine(s) 136 can perform various user-defined operations, such as emulate a desired interrupt handler. In some examples, the call-back routine(s) 136 can accept parametric input, and the interrupt handler 134 can provide such parametric input to the call-back routine 136 upon invoking the call-back routine(s) 136. For example, interrupt handler 134 can provide cycle count or other timing metrics to the call-back routine(s) 136.

The interrupt handler 134 includes a first level interrupt handler 302 and, optionally, a second level interrupt handler 304. As described above with respect to FIG. 2, the first level interrupt handler 302 is executed when the CPU 106 receives the appropriate interrupt signal (either a synthetic interrupt signal generated by the timing logic or the interrupt signal associated with the interrupt handler that was replaced). The first level interrupt handler 302 calls the second level interrupt handler 304, thereby causing the second level interrupt handler 304 to be executed as well.

The first level interrupt handler 302 includes an instruction to record the count value stored in the timing logic at a time corresponding to time point (C). This instruction may be the first instruction included in the first level interrupt handler 302 so that the time at which that instruction executes is the same time as the time at which the first level interrupt handler 302 begins. Such an instruction would be an instruction to record the count value stored in the timing logic at the "current time." For the technique that uses synthetic interrupts, the first level interrupt handler 302 also includes an instruction to disable the generation of synthetic interrupt signals. Synthetic interrupt signals are disabled so that during execution of the interrupt handler 134, an additional instance of the interrupt handler 134 is not executed. The first level interrupt handler 302 can also include additional instructions for execution of the interrupt that are not related to recording the count value stored in the timing logic. These additional instructions can emulate an actual first level interrupt handler and/or invoke a callback function 310, or can be the instructions included in an unmodified version of the interrupt handler 134 in techniques that use non-synthetic interrupts. At the end of the first level interrupt handler 302 is an instruction to record the count value stored in the timing logic at time point (D). The instruction to record the count value stored in the timing logic at time point (D) is at the end of the first level interrupt handler so that the instruction records the count value stored in the timing logic at the time associated with the end of the first level interrupt handler, which is time point (D).

With techniques that use a synthetic interrupt, because the interrupt is generated when the timing logic overflows, the value stored in the timing logic is zero at that point in time. Thus, the first value stored—the count value stored in the timing logic at time point (C)—is the number of cycles that elapse since the interrupt was generated. In other words, the count value stored in the timing logic at time point (C) is equal to the hard ISR startup latency. The value recorded at time (D) minus the value recorded at time (C) is equal to the execution time for the first level interrupt handler.

The above description includes techniques for recording values when the timing logic is configured to count in an increasing direction towards a maximum value. The following provides additional information for calculating hard ISR latency when the timing logic is configured to count in a decreasing direction towards zero or in an increasing direction towards an arbitrary value.

When the timing logic is configured to decrease towards zero, the synthetic interrupt is generated when the timing logic stores a value of zero. The hard ISR start latency is calculated as (zero minus the value stored in the counter when the hard ISR begins) divided by the counting frequency. The counter is reset to the interrupt generation period (i.e., one divided by the frequency with which interrupt generation is desired) divided by the counting frequency. The counting frequency is the number of cycles after which a single count is deemed to have occurred. Thus, a counting frequency of 5 cycles means that a count occurs every five cycles. When the timing logic is configured to increase towards an arbitrary value, interrupt generation occurs when the value of the timing logic equals or exceeds that arbitrary value. The hard ISR startup latency is calculated as (the value stored in the timing logic minus the arbitrary value) divided by the counting frequency. The counter is reset to the arbitrary value minus (the interrupt generation period divided by the counting frequency).

The second level interrupt handler 304 includes an instruction to record the count value stored in the timing logic at time point (E), optionally other instructions for handling the interrupt (e.g., instructions to emulate a second level interrupt handler and/or invoke a callback function 310), and an instruction to record the count value stored in the timing logic at time point (F). As with the instructions in the first level interrupt handler 302, the instruction to record the count value stored in the timing logic at time point (E) is located at the beginning of the second level interrupt handler 304, so that the value recorded is recorded at the appropriate time (i.e., time (E)). Similarly, the instruction to record the count value stored in the timing logic at time point (F) is located at the end of the second level interrupt handler 304, so that the time at which the count value stored in the timing logic is recorded by that instruction corresponds with time point (F). The value of (E) minus (D) is equal to the threaded ISR scheduling latency. The value of (F) minus (E) is equal to the threaded ISR execution time.

In either the threaded ISR 304 or first level ISR 302 may be an instruction to call an additional function provided by a user (not shown) after the threaded ISR 304 finishes executing. This additional function can be used to provide emulation of computation or data access workload in the respective ISRs.

At the end of either the threaded ISR 304 or first ISR 302 (if threaded ISR 304 is omitted), the OS is configured to wake up a user-level program which includes an instruction to record the count value stored in the cycle counter 108 at time point (G) and an instruction to re-enable the synthetic interrupt. The value of (G) minus (F) (or (D) if the threaded ISR 304 is omitted) is equal to the user-program scheduling time.

The interrupt handler 134 that executes is configurable in a number of ways. For example, the interrupt handler 134 may vary in type, priority, or in other ways.

The schedule with which the interrupt handler 134 samples the time stored in the timing logic is referred to herein as the "sampling schedule."

Various modifications to the above-described example implementations are possible. For example, instead of or in addition to recording the count value stored in the timing logic in one or both of the first level interrupt handler 302 and the second level interrupt handler 304, other performance-related measurements may be taken. For example, a number of cache misses, a number of cache hits, a number of branch prediction misses, or other performance-related measurements may be taken during execution of one or more interrupt handlers.

In another example, the interrupt handler 134 does not include the second level interrupt handler 304, but includes the first level interrupt handler 302. In such a scenario, the first level interrupt handler 302 may execute to record the hard ISR startup latency, but no metrics associated with the second level interrupt handler 304 would be taken. Alternatively, monitoring application 118 may instruct SIP 132 to selectively enable or disable the second level interrupt handler 304 in response to various events.

In another example, the monitoring SIP 132 may selectively enable or disable the entire interrupt handler 134 based on various events. For example, when a particular thread, process, or application of interest is active, SIP 132 may enable the interrupt handler 134, but may disable the interrupt handler 134 at other times.

In yet another example, instead of counting up, timing logic may count down. Further, instead of the synthetic interrupt triggering when timing logic overflows, the synthetic interrupt may trigger when the value stored in timing logic reaches 0 or is equal to a pre-defined value.

In a further example, monitoring application 118 may instruct SIP 132, via API 128, to alter one or both of the first level interrupt handler 302 or the second level interrupt handler 304 by adding or removing instructions of different types, to determine how such additions or removals affect the various metrics described above. In one example, multiple repeated driver accesses may pollute a cache memory, causing latency (e.g., hard ISR startup latency) to increase. Upon detecting an increase in latency, monitoring application 118 may remove instructions that may cause misses in a particular cache memory in order to determine whether multiple drive accesses are causing latency to increase.

In yet another example, the first level interrupt handler 302 may check the value of the program counter (PC) register immediately prior to the first level interrupt handler 302, in order to determine what process (e.g., a driver) was executing immediately prior to the first level interrupt handler 302. This may allow monitoring application 118 to determine that that process is causing increased latency.

In yet another example, monitoring application 118 may check for a deviation from expected behavior. Such a deviation may occur in a variety of situations. In one example, the deviation may occur because of a security breach. For example, if malicious code were injected into the integrated circuit 100, the malicious code may cause an increase in latency. The deviation may be defined by an excursion outside of behavior measured over a certain preset period of time. For example, if the hard ISR startup latency never deviates above a first value after monitoring for a first amount of time, but then suddenly deviates above that first value, the monitoring software 308 may determine that a deviation from expected behavior has been detected.

In yet another example, multiple interrupt handlers may be provided for multiple different timing logic units so that multiple synthetic interrupts may be generated at different schedules.

In a further example, programmable cycle counter 138 within programmable logic 102 may be configured to generate synthetic interrupts based on a schedule that is not strictly periodic. For example, a schedule may comprise a periodic schedule with added variance. Other more complicated schedules are possible as well.

Figure 4:
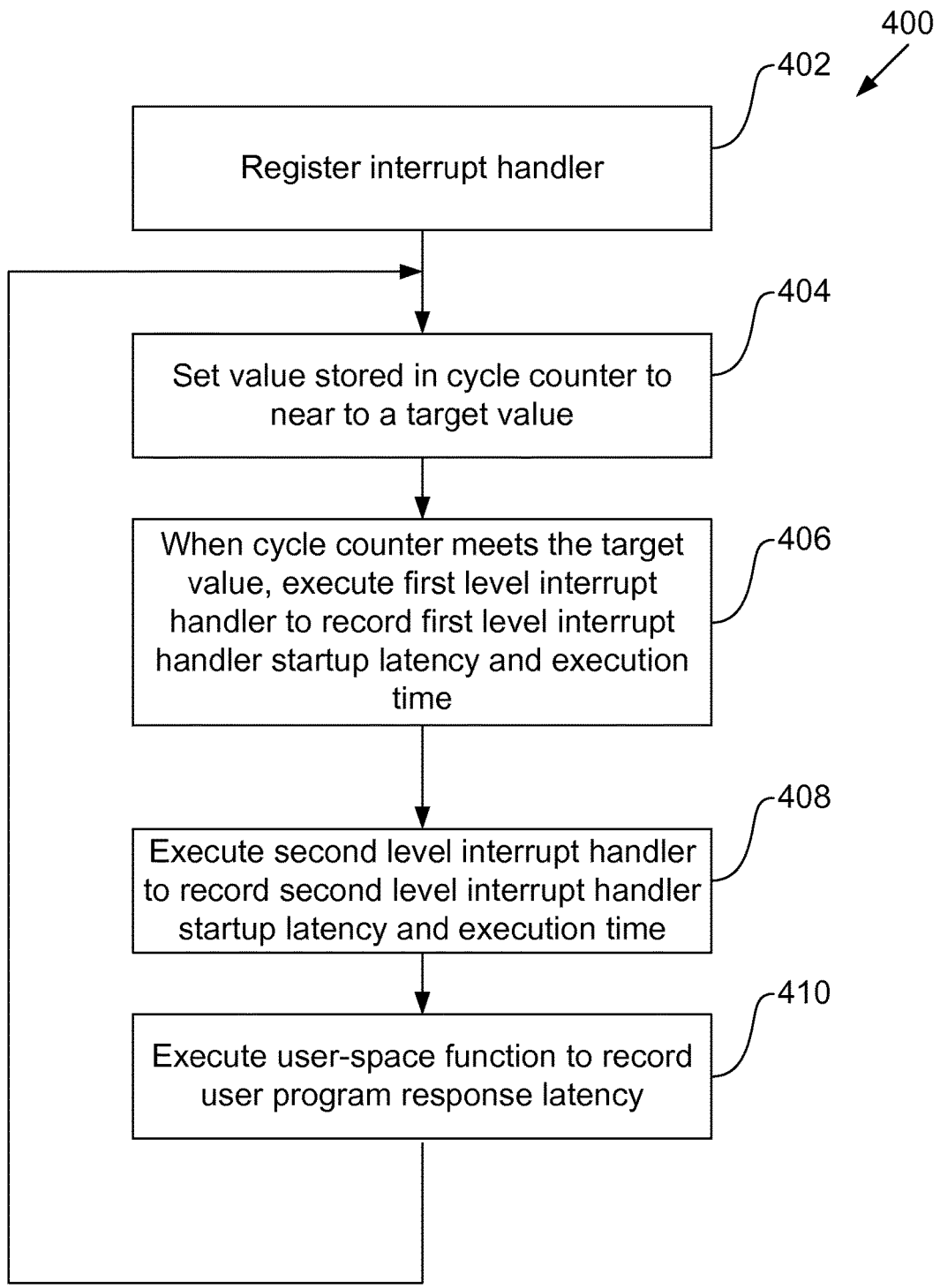
FIG. 4 is a flow diagram of method steps for obtaining interrupt performance metrics, in accordance with one example.

FIG. 4 is a flow diagram of method steps for obtaining interrupt performance metrics with a technique uses includes synthetic interrupts, in accordance with one example. Although the method steps are described in conjunction with FIGS. 1-3, persons skilled in the art will understand that any system configured to perform the method steps, in various alternative orders, falls within the scope of the present disclosure.

As shown, a method 400 begins at step 402, where SIP 132 registers interrupt handler 134 for execution. This act of registering causes the interrupt handler 134 to execute when timing logic generates a synthetic interrupt signal. At step 404, the SIP 132 sets the value stored in the timing logic to close to a trigger value. SIP 132 sets the stored value based on the amount of time after which the interrupt handler 134 should next execute.

At step 406, when the value stored by the timing logic meets the target value, the timing logic generates a synthetic interrupt signal, which travels to interrupt controller 110. Interrupt controller 110 transmits the synthetic interrupt signal to a CPU 106, which, in response, executes the interrupt handler 134. More specifically, CPU 106 first executes the first level interrupt handler 302 and then executes the second level interrupt handler 304 if present. The first level interrupt handler 302 records count values related to the first level cycle counter interrupt handler startup latency (hard ISR startup latency) and the first level cycle counter interrupt handler execution time (hard ISR execution time).

At step 408, the second level cycle counter interrupt handler is executed and records count values related to the second level interrupt handler startup latency (threaded ISR startup latency) and the second level interrupt handler execution time. At step 410, after the second level interrupt handler ends execution, a user-space function executes, recording the count value related to the user program response latency. After step 410, the method returns to step 404.

Figure 5:
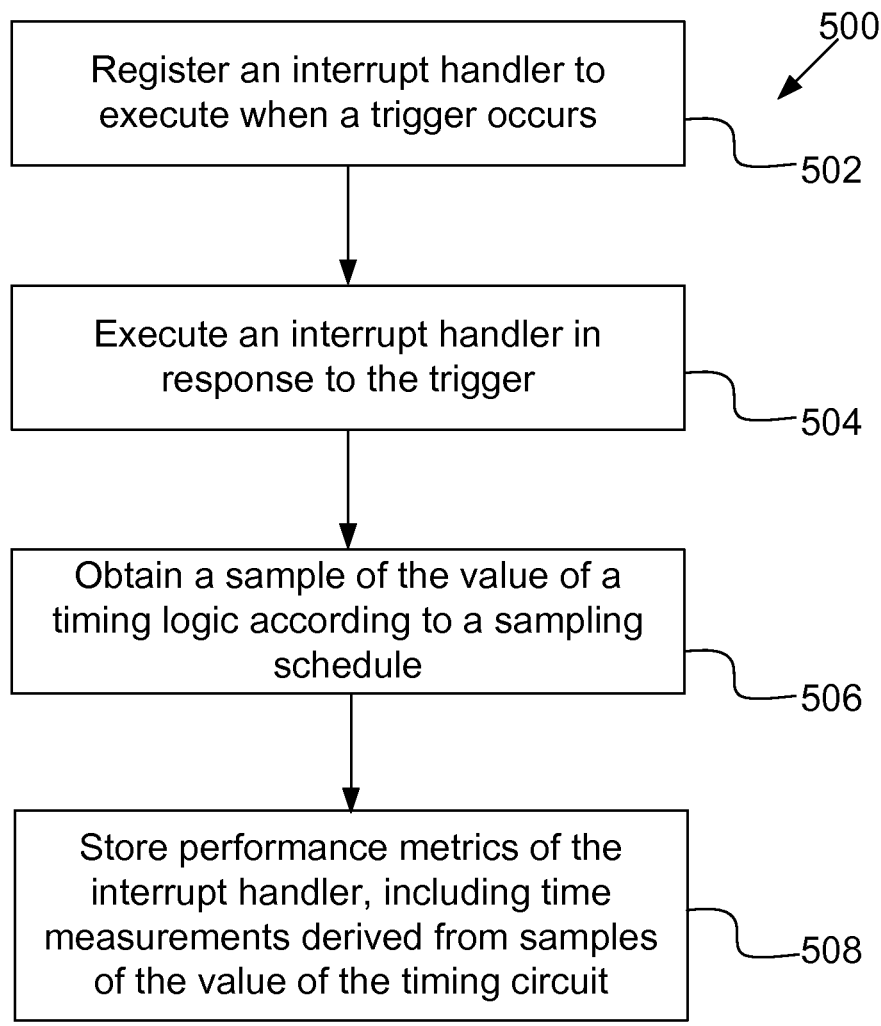
FIG. 5 is a flow diagram of method steps for obtaining interrupt performance metrics, in accordance with another example.

FIG. 5 is a flow diagram of method steps for obtaining interrupt performance metrics for a generalized technique that uses either synthetic or non-synthetic interrupts, in accordance with another example. Although the method steps are described in conjunction with FIGS. 1-3, persons skilled in the art will understand that any system configured to perform the method steps, in various alternative orders, falls within the scope of the present disclosure.

As shown, a method 500 begins at step 502, where SIP 132 registers an interrupt handler to execute when a trigger occurs. The trigger may be when a cycle count reaches a set threshold value or when a particular associated interrupt signal is issued. At step 504, an interrupt handler 134 is executed (e.g., by the microprocessor 106) in response to the trigger. At step 506, the interrupt handler 134 obtains at least one sample of the value of the timing logic according to a sampling schedule. The sampling schedule may be chosen to obtain certain characteristic performance metrics, such as hard ISR startup latency, as described above. At step 508, a memory 114 stores the obtained performance metrics, including time measurements derived from samples of the value of the timing logic. The CPU 106 executing the interrupt handler 134 may store the obtained performance metrics.

The various examples described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more example implementations may be useful machine operations. In addition, one or more examples also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various examples described herein may be practiced with other computer system configurations including handheld devices, microprocessor systems, microprocessor-based or programmable consumer electronics, minicomputers, mainframe computers, and the like.

One or more examples may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a Compact Disc (CD)-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

While the foregoing is directed to specific example implementations, other and further example implementations may be devised without departing from the basic scope thereof, and the scope thereof is determined by the claims that follow.

What is claimed is:

1. An integrated circuit comprising:
   a microprocessor configured to execute an interrupt-service-routine (ISR) monitoring framework that includes:
      a lightweight interrupt handler executable in response to a trigger condition and associated with synthetic interrupts, the lightweight interrupt handler obtaining configured to obtain timing data that includes at least one sample of a value of a timing logic according to a sampling schedule;
      an application programming interface (API) that exposes interrupt-configuration functionality for registering the lightweight interrupt handler with a supervisory program, for configuring the lightweight interrupt handler to obtain the timing data, and for configuring an interrupt schedule for generating the synthetic interrupts; and
      a synthetic interrupt programmer configured to control the timing logic to repeatedly trigger a synthetic interrupt for the microprocessor each time a value of the timing logic satisfies a trigger event according to the interrupt schedule, wherein the lightweight interrupt handler comprises fewer instructions than an interrupt service routine associated with an actual interrupt.

2. The integrated circuit of claim 1, wherein the ISR monitoring framework further includes:
   a data analyzer configured to derive statistical data from the timing data.

3. The integrated circuit of claim 1, wherein the timing data include measurements of at least one of: startup latency of a first-level portion of the interrupt handler, execution time of the first-level portion of the interrupt handler, startup latency of a second-level portion of the interrupt handler, execution time of the second-level portion of the interrupt handler, or startup latency of a user application.

4. The integrated circuit of claim 1, wherein the interrupt handler is configured to invoke at least one callback function of a monitoring application.

5. The integrated circuit of claim 1, wherein the timing logic comprises a cycle counter in the microprocessor, a counter configured in programmable logic of the integrated circuit, or a counter in the integrated circuit.

6. The integrated circuit of claim 1, wherein the interrupt handler further includes a high-priority interrupt handler that records a first cycle count from the timing logic when the high-priority interrupt handler begins executing and a second cycle count from the timing logic when the high-priority interrupt handler finishes executing.

7. The integrated circuit of claim 6, wherein the interrupt handler further includes a low-priority interrupt handler that executes after the high-priority interrupt handler executes and that records a third cycle count from the timing logic when the low-priority interrupt handler begins executing and a fourth cycle count from the timing logic when the low-priority interrupt handler finishes executing.

8. The integrated circuit of claim 7, wherein the ISR monitoring framework further includes a data analyzer that calculates performance metrics based on one or more of the first cycle count, the second cycle count, the third cycle count, and the fourth cycle count.

9. The integrated circuit of claim 7, wherein the microprocessor further executes monitoring software that detects a security breach by determining that one of the first cycle count, the second cycle count, the third cycle count, and the fourth cycle count indicates a latency that deviates from an expected range.

10. The integrated circuit of claim 1, wherein the trigger condition comprises the timing logic triggering the synthetic interrupt.

11. The integrated circuit of claim 10, wherein:
the interrupt-configuration functionality allows a monitoring application to configure at least one of: the interrupt schedule, the sampling schedule, a type of the synthetic interrupt, or a priority of the synthetic interrupt.

12. The integrated circuit of claim 10, wherein the trigger event comprises the value of the timing logic reaching one of the following conditions: overrunning a maximum value, underrunning a minimum value, or passing over a predefined value, and wherein the synthetic interrupt programmer controls the timing logic by resetting the value of the timing logic to an initial value after each trigger event.

13. The integrated circuit of claim 1, wherein the interrupt-configuration functionality allows a monitoring application to configure at least one of a type of the synthetic interrupt or a priority of the synthetic interrupt.

14. A method comprising:
executing a lightweight interrupt handler associated with synthetic interrupts in response to a trigger condition, the lightweight interrupt handler obtaining timing data that includes at least one sample of a value of a timing logic according to a sampling schedule;

exposing, with an application programming interface (API), interrupt-configuration functionality for registering the lightweight interrupt handler with a supervisory program, for configuring the lightweight interrupt handler to obtain the timing data, and for configuring an interrupt schedule for generating the synthetic interrupts; and controlling, with a synthetic interrupt programmer, the timing logic to repeatedly trigger a synthetic interrupt each time a value of the timing logic satisfies a trigger event according to the interrupt schedule, wherein the lightweight interrupt handler comprises fewer instructions than an interrupt service routine associated with an actual interrupt.

15. The method of claim 14, wherein the trigger condition comprises the timing logic triggering the synthetic interrupt.

16. The method of claim 14, wherein the timing data include measurements of at least one of: startup latency of a first-level portion of the interrupt handler, execution time of the first-level portion of the interrupt handler, startup latency of a second-level portion of the interrupt handler, execution time of the second-level portion of the interrupt handler, or startup latency of a user application.

17. The method of claim 14, further comprising invoking, by the interrupt handler, at least one callback function of a monitoring application.

18. The method of claim 14, wherein the interrupt handler includes a high-priority interrupt handler that records a first cycle count from the timing logic when the high-priority interrupt handler begins executing and a second cycle count from the timing logic when the high-priority interrupt handler finishes executing.

19. The method of claim 18, wherein the interrupt handler further includes a low-priority interrupt handler that executes after the high-priority interrupt handler executes and that records a third cycle count from the timing logic when the low-priority interrupt handler begins executing and a fourth cycle count from the timing logic when the low-priority interrupt handler finishes executing.

20. The method of claim 14, wherein the interrupt-configuration functionality allows a monitoring application to configure at least one of the sampling schedule, a type of the synthetic interrupt, or a priority of the synthetic interrupt.

* * * * *